United States Patent [19]

Davis et al.

[11] 4,324,710

[45] Apr. 13, 1982

[54] NATURALLY OCCURRING THERMOPLASTIC RESINS AS A SUBSTITUTE FOR VARIOUS PETROLEUM-DERIVED MATERIALS IN RUBBER STOCKS

[75] Inventors: James A. Davis, Uniontown; Robert C. Koch, Akron, both of Ohio

[73] Assignee: The Firestone Tire & Rubber Company, Akron, Ohio

[21] Appl. No.: 193,198

[22] Filed: Oct. 2, 1980

[51] Int. Cl.$^3$ .................. C08L 93/04; C09F 1/00
[52] U.S. Cl. ..................... 524/76; 260/108; 260/109; 260/110; 152/374; 524/274
[58] Field of Search ............ 260/24, 27 R, 4 R, 108, 260/109, 110

[56] References Cited

U.S. PATENT DOCUMENTS

| | | | |
|---|---|---|---|
| 2,319,959 | 5/1943 | Tierney | 260/4 R |
| 2,508,893 | 5/1950 | Sadowski et al. | 260/27 R |
| 3,412,061 | 11/1968 | Drukker | 260/27 R |
| 3,786,011 | 1/1974 | Price et al. | 260/4 R |
| 3,862,068 | 1/1975 | Russell | 260/27 R |
| 4,147,831 | 4/1979 | Baliuth | 260/4 R |
| 4,252,171 | 2/1981 | Imai et al. | 260/27 R |

*Primary Examiner*—H. S. Cockeram

[57] ABSTRACT

Natural occurring thermoplastic resins are used as a substitute for process oils and/or hydrocarbon resins, as well as for tackifiers, softeners, extenders, processing aids, and cure retarders, in rubber stocks, as for example, a rubber skim stock used in making a tire. The resins, which are derived from crude wood rosin, are high melting thermoplastic resins having carboxylic acid groups and are insoluble in aliphatic hydrocarbons. The source of the natural occurring resins is in ample supply as they are obtained from pine trees grown in North America. A specific type of thermoplastic resin is Vinsol, a registered trademark of Hercules Corporation.

9 Claims, No Drawings

NATURALLY OCCURRING THERMOPLASTIC RESINS AS A SUBSTITUTE FOR VARIOUS PETROLEUM-DERIVED MATERIALS IN RUBBER STOCKS

TECHNICAL FIELD

The present invention relates to the replacement of various petroleum-derived components such as petroleum-derived resins and process oils utilized in various rubber stocks, for example, those stocks normally used in the manufacture of tires, without any adverse effect on the physical properties of the cured rubber stock.

BACKGROUND ART

Heretofore, resins such as those derived from southern pine stump wood, which are compatible with a variety of film-forming resins, and yet are substantially insoluble in some commonly used solvents such as aliphatic hydrocarbons, have been used to advantage in the formulations of coatings and plastics resistant to such materials. The resins have also been utilized in adhesives, emulsions, cements, electrical installation, inks, coating and bonding materials, and plastics. However, any use in the rubber field has been limited to general purpose rubber compounding or as a reclaiming agent for rubber. Thermoplastic resins obtained from southern pine stump wood have not been utilized in rubber stocks, nor as a complete replacement for process oils and/or hydrocarbon resins, which are utilized in rubber stocks.

DISCLOSURE OF INVENTION

In practicing the present invention, a natural occurring thermoplastic resin is added as a partial or complete replacement for various petroleum-derived components in a rubber stock such as process oils, hydrocarbon resins, tackifiers, softeners, extenders, processing aids, and cure retarders. The thermoplastic resin is characterized as a resinous dark solid having a typical softening point of approximately 110° C. to about 130° C. with an acid number between 40 and 105. The resin further has a major phenolic fraction, a minor neutral fraction, and a minor rosin-derived fraction. The thermoplastic resin is further characterized by the phenolic fraction as containing phlobaphenes, carboxylated phlobaphenes, substituted stilbenes, lignan hydroxy lactone, wherein said neutral fraction includes a wax and polymerized terpenes and wherein said resin derived fraction includes resin acids, and polymerized resin acids. An example of a specific thermoplastic resin in Vinsol, a registered trademark of Hercules Corporation. The thermoplastic resin, in replacing process oils such as conventional aromatic oils, said hydrocarbon resins, and the like, are utilized in a rubber stock, generally in a tire, for example, a tread ply skim, body ply skim, sidewall, innerliner, stabilizer ply insert, bead filler, toe filler, chafer, undertread, tread, and the like. The substitution of the thermoplastic resin does not impart any adverse effect on the physical properties of this particular rubber stock and, in fact, unexpectedly improves the 212° F. tear properties, green strength, and results in higher low strain modulus.

Generally, a cured rubber stock containing conventional rubber components, said stock being a layer in a rubber article, the improvement, comprising: a minor portion of a thermoplastic resin incorporated into said stock prior to curing, said thermoplastic resin comprising carboxylic acid groups and derived from crude wood rosin.

BEST MODE FOR CARRYING OUT THE INVENTION

In the manufacture of rubber articles such as tires, several components actually make up the tire. Thus, some of the components or layers found in a typical tire include a tread ply skim, body ply skim, bead filler, innerliner, sidewall, stabilizer ply insert, toe filler, chafer, undertread, tread, and the like. Most of the components utilized in the various layers of a tire or rubber article are made from petroleum materials and petroleum-based materials. Such materials are rapidly escalating in cost, as well as facing the distinct possibility of becoming scarce in the future.

According to the concepts of the present invention, it has been unexpectedly found that a type or class of naturally occurring resins can be partially or totally substituted for a petroleum product utilized in the various tire layers, specifically for process oil and hydrocarbon resins, as well as for tackifiers, softeners, extenders, cure retarders, and processing aids, all known to those skilled in the art. By process oils, it is meant oils such as aromatic oils, naphthenic oils, paraffinic oils, and blends thereof. By hydrocarbon resins, it is meant resins derived from petroleum sources. Specific examples include Piccotac, Piccolyte, Piccodiene, and Piccopale, all manufactured by Hercules, the Resinex resins distributed by Harwick, the Nevex 100 resins made by Neville Chemical, polyterpene resins, coumarone-indene resins, and the like. Tackifiers relate to building tack as required in "plied up" products such as tires, belts, and various types of hose. An example of a tackifier is a phenolic resin. Softeners permit the rapid incorporation of fillers and other ingredients, and reduce power consumption. Softeners reduce internal friction in calendering and extrusion, thus minimizing scorch. Softeners are also used in compounding for lower modulus and hardness as required in some applications. Plasticizers, low cost hydrocarbon resins and oils are specific examples of softeners. Extenders are added to compounds to adjust the physical condition of a product. Low cost process oils and mineral fillers, e.g., clay, serve as extenders. Cure retardants are incorporated in rubber stocks to slow-up the rate of cure, especially at the onset of cure. Materials which have a high acid number are known to retard cure. Benzoic acid and boric acid are two examples of cure retarders. A processing aid is a compound, generally added in an amount of from 2 to about 5 parts per 100 parts of rubber hydrocarbon, can be added with fillers, e.g., carbon black, Hi Sil, etc., for better mixing and filler dispersion as well as to improve polymer solubility (in polymer blends) or at the end of the mix cycle in order to improve mixing and calendering. Additionally, processing aids reduce mixing time, improve filler and pigment (zinc oxide, resins, etc.) dispersion, lower mixing temperature, reduce mixing energy consumption, and enhance stock processing (tubing, extruding, etc.) and mold release of the cured part. A typical processing aid is Struktol WB212, manufactured by the Struktol Company of America.

The amount of petroleum derived component which exists in a rubber stock is minor and will vary with the type of stock as well as with the specific component, e.g., hydrocarbon resin, process oil, tackifiers, etc., and is well known to the art. Generally, such amounts are usually less than 10 percent by weight of the total stock weight, and often between 2 percent and 6 percent by weight.

The thermoplastic resins of the present invention are dark materials derived from crude wood rosin. Crude wood rosin is the product remaining after a solvent extract of pine wood chips has been separated into recovered solvent, turpentine, pine oil, and other terpenes. The crude wood rosin is separated into a pale rosin and a resinous fraction containing the dark colored material. It is from this resinous material that the resins of the present invention are derived. A specific example of a thermoplastic resin is Vinsol, manufactured by Hercules Corporation, which has a softening point of approximately 110° C. to about 130° C. (Hercules drop method), and an acid number of about 95. The thermoplastic resins are soluble in most polar solvents, but insoluble in water, aliphatic hydrocarbon solvents, fats, and oils. The thermoplastic resin further contains carboxylic acid groups therein. The thermoplastic resin, which has a high melting point, from a more chemical nature can be described as a complex mixture of high molecular weight phenolic compounds, resin acids, neutral materials, and several minor components. The acid number can generally range from about 40 to about 105, and preferably from about 90 to about 105, with the softening point ranging from about 110° C. to about 130° C. Although the material is derived from southern pine wood, while it may be viewed as a rosin, this is generally considered to be a misconception. A thermoplastic resin of the present invention is a complex mixture of many components, typically, a majority of a phenolic fraction, a neutral fraction, and a rosin derived fraction. Its constituents include high molecular weight phenols, carboxyl-substituted phenols, substituted phenyl ethers, and polyphenols. In contains acidic materials derived from resin acids and oxidized resin acids. High molecular weight neutral compounds are present such as polymerized terpenes and natural waxes. Generally, Table I gives an approximate idea of the various types of compounds contained in the thermoplastic resin of the present invention and their approximate concentration. Naturally, the material can vary from pine tree grove to pine tree grove, as well as from area of country to area of country, as well as from type of particular recovery process utilized, and the like. The composition of a specific thermoplastic resin, Vinsol, manufactured by the Hercules Corporation is set forth in Table I.

TABLE I

TYPICAL COMPOSITION OF Vinsol ® THERMOPLASTIC RESIN

| | Percentage |
|---|---|
| PHENOLIC FRACTION | 57 |
| Phlobaphenes | 24% |
| Carboxylated phlobaphenes | 11% |
| Substituted stilbenes | 9% |
| Lignan hydroxy lactone | 7% |
| Flavonoid compounds | 4% |
| Lignin-type material | 2% |
| NEUTRAL FRACTION | 15 |
| Wax | 5% |
| Polymerized terpenes | 9% |
| Dimethoxystilbene | 1% |
| ROSIN-DERIVED FRACTION | 28 |
| Resin acids | 17% |
| Oxidized resin acids | 1% |

TABLE I-continued

TYPICAL COMPOSITION OF Vinsol ® THERMOPLASTIC RESIN

| | Percentage |
|---|---|
| Polymerized resin acids | 10% |

Vinsol is commercially available generally as a solid, as a flake, as a pulverized powder, as a 40 percent emulsion, as a water soluble sodium soap, as a blend of the sodium soap and fatty acid groups, and the like.

Naturally, the phenolic fraction, the neutral fraction, and the rosin-derived fraction can vary as well as the specific components or lack thereof in each fraction. As previously noted, the thermoplastic resin of the present invention relates to the aliphatic hydrocarbon insoluble solid portion of the pine wood extract.

The thermoplastic resin of the present invention can be substituted partially, that is any desirable amount, such as generally at least 25 percent by weight, or at least 50 percent by weight, and preferably totally substituted for the various oils, hydrocarbon resins, as well as tackifiers, softeners, extenders, processing aids, and cure retarders utilized in rubber compositions. The amount which can be utilized can vary from about one-half part to about 20 or 25 parts for every 1 part of process oil, or hydrocarbon resin, etc., replaced. A more desirable range is from about one-half to about 10 parts with a range of approximately 1 to 1 being preferred.

The thermoplastic resin derived from southern pine wood can be blended with various rubber stocks, according to any conventional or known manner. Generally, it can be used in any conventional rubber stock formulation or other known formulations as a complete replacement for the above-noted specific components, especially for the oil and hydrocarbon resins. Such rubber stock formulations are well known to those skilled in the art and include the various layers having conventional components therein utilized in making a tire. Such formulations can generally be found in any number of rubber handbooks, textbooks, and the like.

The present invention also finds utility in, for example, motor mounts, rubber bushings, torsilastic springs, power belts, printing rolls, rubber shoe heels and soles, rubber floor tiles, caster wheels, elastomeric seals and gaskets, conveyor belt covers, wringer rolls, hard rubber battery cases, automobile floor mats, mud flaps for trucks, ball mill liners, and the like.

To ensure that the thermoplastic resin is uniformly dispersed in the rubber stock, regardless of product type, desirably, the resin is added to the particular mixing device, i.e., a Banbury, along with any carbon black addition.

Natural rubber, synthetic rubbers, and blends thereof can be used in the present invention. Such elastomers include polydienes made from conjugated dienes having from 4 to 10 carbon atoms, such as polybutadiene or polyisoprene, natural rubber (i.e., cis-1,4-polyisoprene), copolymers of dienes such as butadiene or isoprene with other copolymerizable vinyl substituted aromatic monomers, for example, those having from 8 to 12 carbon atoms, such as styrene, alpha-methylstyrene, etc., an acrylic ester, methylisopropenylketone, isobutylene, acrylonitrile or an unsaturated carboxylic acid; halogenated rubbers such as polychloroprene or fluororubbers; interpolymers of one or more monoolefins with a monomer which confers unsaturation on the interpolymer, for example, an unsaturated ethylene/propylene/dicyclopentadiene terpolymer, sulfur-vulcanizable polyurethane rubbers, butyl rubber containing at least 0.8 percent unsaturation; and combinations of the above elastomers, e.g., natural rubber/butadiene-styrene copolymer blends, a mixture of a saturated copolymer of ethylene and propylene with an unsaturated interpolymer of ethylene, propylene and a monomer comprising unsaturation in the interpolymer, etc.

The substitution of the thermoplastic resin as set forth herein has been found not to cause any adverse results when utilized in various rubber stocks such as a tread ply skim stock, sometimes referred to as a wire, steel cord, or stabilizer ply skim stock used in the manufacture of a steel belted radial tire. The thermoplastic resin may be utilized in other rubber stocks for making a tire, as noted above, for example, body ply skim, innerliner, sidewall, stabilizer ply insert, bead filler, toe filler, chafer, undertread, tread, and the like. Preferably, the thermoplastic resin is used to replace the hydrocarbon resin and/or process oil in the innerliner, the tread ply skim, and the tread.

The thermoplastic resins of the present invention can be used in typical or conventional rubber compositions, especially those, as previously noted, used in making various tire components. Thus, for the most part, the resins are compatible with the rubber compositions and various compounding additives such as antioxidants, accelerators, sulfur, carbon black, cure retardants, clay fillers, activators, processing aids, inert fillers, etc., which are present in the rubber stock.

As apparent from the examples set forth below, unexpected improvements are obtained when the thermoplastic resin was utilized in a conventional tread ply skim; namely, higher low strain modulus and green strength was achieved, better 212° F. ring tear properties, and so forth.

The invention will be better understood by reference to the following examples.

EXAMPLE I

A conventional tread ply skim stock, having the ingredients set forth in Table II, was prepared using a 1100 cc Banbury mixer; the amount of each compounding ingredient was based on parts per hundred parts rubber hydrocarbon or synthetic polymer (i.e., phr). The following sequence of addition and mixing times were utilized to prepare the masterbatch for the control stock: 100 phr natural rubber and 0.50 phr stearic acid were initially added to the 1100 cc Banbury mixer. After 0.50 to 1 minute, about 50 percent of a blend of 60 phr HAF black, 7.5 phr zinc oxide, and 2 phr hydrocarbon resins (1) were Banbury mixed into the above composition initially introduced into the Banbury. Mixing was then continuous and after 2 to 3 minutes of continued mixing, the remainder of the above blend was introduced; after about 3.5 minutes of continuous mixing, 2 phr process oil[3], 2 phr Santoflex DD[2] and 2 phr cobalt additives (4), were added to the masterbatch. Mixing was continued for an additional 3 minutes to ensure a uniform dispersion of the additives, the total mixing time was about 6.5 minutes, and the mixing temperature was between 345° to 365° F. (rubber masterbatch) at the completion of the mixing cycle. This mixture was then dumped on a two roll mill for final mill mixing; the rubber masterbatch was then allowed to cool to about 140° F. before adding the curatives.

To the above masterbatch on the two roll mill was added the following sequence and phr. Initially, 1.0 phr Santoflex 13[7] was added; next, after continued mill mixing, 8.7 phr of a cure package consisting of 7.5 phr sulfur MB[6], 0.80 phr NOBS Special[5] and 0.40 phr Santogard PVI[8] was added. Mill mixing was continued for approximately up to 12 minutes at a mill roll temperature ranging between 160° F. and 180° F.

TABLE II

| CONVENTIONAL TREAD PLY SKIM | |
|---|---|
| BANBURY MASTERBATCH (parts by weight) | |
| Natural rubber | 100 |
| HAF black (ASTM Type N-330) | 60 |
| Zinc oxide | 7.50 |
| Stearic acid | 0.50 |
| Hydrocarbon resins[1] | 2.0 |
| Santoflex DD[2] | 2.0 |
| Dutrex 726 oil[3] | 2.0 |
| Cobalt containing additive[4] | 2.0 |
| MILL FINAL | |
| Masterbatch (parts by weight) | 176.0 |
| NOBS Special[5] | 0.80 |
| Sulfur MB[6] | 7.50 |
| Santoflex 13[7] | 1.0 |
| Santogard PVI[8] | 0.40 |
| TOTAL | 185.7 |

| Trade Name | Composition | Supplier |
|---|---|---|
| [1]Betaprene BR-115 | an aliphatic hydrocarbon resin derived from a petroleum source having a specific gravity of 1.062 and a softening point (ring and ball at 0° C.) of 130 | Reichhold Chemical |
| [2]Santoflex DD | 6-Dodecyl-1,2-dihydro-2,2,4-trimethyl-quinoline | Monsanto |
| [3]Dutrex 726 oil | medium aromatic oil; 0.5% max. Asphaltenes, 30% max. Saturates, 18% max. Polar compounds, 55% min. aromatics | Shell |
| [4]Manobond C 16 | an organo-cobalt-boron complex containing about 16% of cobalt having a structure thought to be $$B \!\!\leftarrow\!\! O\!\!-\!\!Co\!\!-\!\!O\!\!-\!\!\overset{O}{\underset{\|}{C}}\!\!-\!\!R)_3$$ where R is an alkyl radical having from 9 to 12 carbon atoms | Wyrough & Loser (N.J.) |
| [5]Nobs Special | N-oxydiethylene benzothiazole 2-sulfenamide | American Cyanamid |
| [6]Sulfur MB | 80/20 - 80% insoluble sulfur and 20% medium process oil preblend | Stauffer Chemical |
| [7]Santoflex 13 | N-(1,3-dimethyl butyl)-N'-phenyl-p-phenylene-diamine | Monsanto |
| [8]Santogard PVI | N-(cyclohexyl-thio)-phthalimide | Monsanto |

The conventional tread ply skim of Table II was utilized as a control. In Example A, the two parts of hydrocarbon resin utilized in the masterbatch was replaced with Vinsol resin, a dark, high melting, aliphatic hydrocarbon-insoluble resin manufactured by Hercules, Inc., Wilmington, Delaware. In Example B, the two parts of the hydrocarbon resin as well as the two parts of the process oil were replaced with a total of four parts of Vinsol. Examples A and B were prepared in an exact matter as the control. The control stock and Examples A and B were tested for various physical properties as set forth in Table III.

TABLE III

VINSOL RESIN AS A REPLACEMENT FOR HYDROCARBON RESIN AND PROCESS OIL IN A CONVENTIONAL TREAD PLY SKIM

|  | CONTROL | EXAMPLE A | EXAMPLE B |
|---|---|---|---|
| Dutrex 726 oil, phr | 2.0 | 2.0 | 0 |
| Hydrocarbon resin, phr | 2.0 | 0 | 0 |
| Vinsol resin, phr | 0 | 2.0 | 4.0 |
| Low strain modulus at 73° F. - 75 Gauge Slab - Cured 23 minutes at 300° F. | | | |
| 10% elongation, psi | 130 | 130 | 145 |
| Ring tear at 212° F. - 100 Gauge Slab - Cured 23 minutes at 300° F. | | | |
| Lbs/Inch | 408 | 423 | 457 |

As apparent from the above examples, the addition of a thermoplastic resin for the hydrocarbon resin did not adversely affect various physical properties and, in fact, unexpectedly improved such properties. Such improvements were further noted when the thermoplastic resin was further substituted for process oil in the tread ply skim stock.

Having described the best mode and preferred embodiments of my invention, in accordance with the patent statutes, it is to be understood that various other embodiments can be utilized, with the scope of the invention being measured by the attached claims.

What is claimed is:

1. In a cured rubber stock containing conventional rubber components, said stock being a layer in a rubber article, the improvement, comprising:
   the stock layer having incorporated therein prior to curing thereof a minor portion of a thermoplastic resin derived from crude wood rosin and comprising carboxylic acid groups,
   said thermoplastic resin substituted for at least 25% by weight of a petroleum derived product normally contained in said stock layer.

2. A cured rubber stock according to claim 1, wherein said thermoplastic resin has a softening point of from about 110° C. to about 130° C., and an acid number of from about 40 to about 105, and wherein the amount of said thermoplastic resin ranges from about 0.5 to about 25 parts per part by weight of said petroleum derived product which has been substituted.

3. A cured rubber stock according to claim 2, wherein said thermoplastic resin substitutes in said stock at least 25% by weight of said petroleum derived product selected from the group consisting of a hydrocarbon resin, a process oil, a tackifier, a softener, an extender, a processing aid, a cure retarder, and combinations thereof.

4. A cured rubber stock according to claims 2 or 3, wherein said rubber layer is a component in a tire, and said thermoplastic resin has an acid number of from about 90 to about 105.

5. A cured rubber stock according to claim 4, wherein said tire components are selected from the group consisting of a tread ply skim, stabilizer ply insert, body ply skim, sidewall, innerliner, bead filler, toe filler, chafer, undertread, tread, and combinations thereof.

6. A cured rubber stock according to claim 5, wherein said thermoplastic resin contains a major amount of a phenolic fraction, a neutral fraction, and a rosin derived fraction.

7. A cured rubber stock according to claim 6, wherein the amount of said thermoplastic resin ranges from about 0.5 to about 10 parts per part of said petroleum derived product substituted, and wherein said tire component is selected from the group consisting of an innerliner, tread ply skim, tread, and combinations thereof.

8. A cured rubber stock according to claim 7, wherein said phenolic fraction approximately contains by weight 24 percent of phlobaphenes, 11 percent of carboxylated phlobaphenes, 9 percent of substituted stilbenes, 7 percent of lignan hydroxy lactone, 4 percent of flavonoid compounds, and 2 percent of a lignin-type material; wherein said neutral fraction approximately contains by weight 5 percent of wax, 9 percent of polymerized terpenes, and 1 percent of dimethoxystilbene; and wherein said rosin-derived fraction approximately contains by weight 17 percent of resin acids, 1 percent of oxidized resin acids, and 10 percent of polymerized resin acids.

9. A cured rubber stock according to claim 8, wherein the amount of said thermoplastic resin is about 1 part per part of said petroleum derived product substituted.

* * * * *